Figure 1:
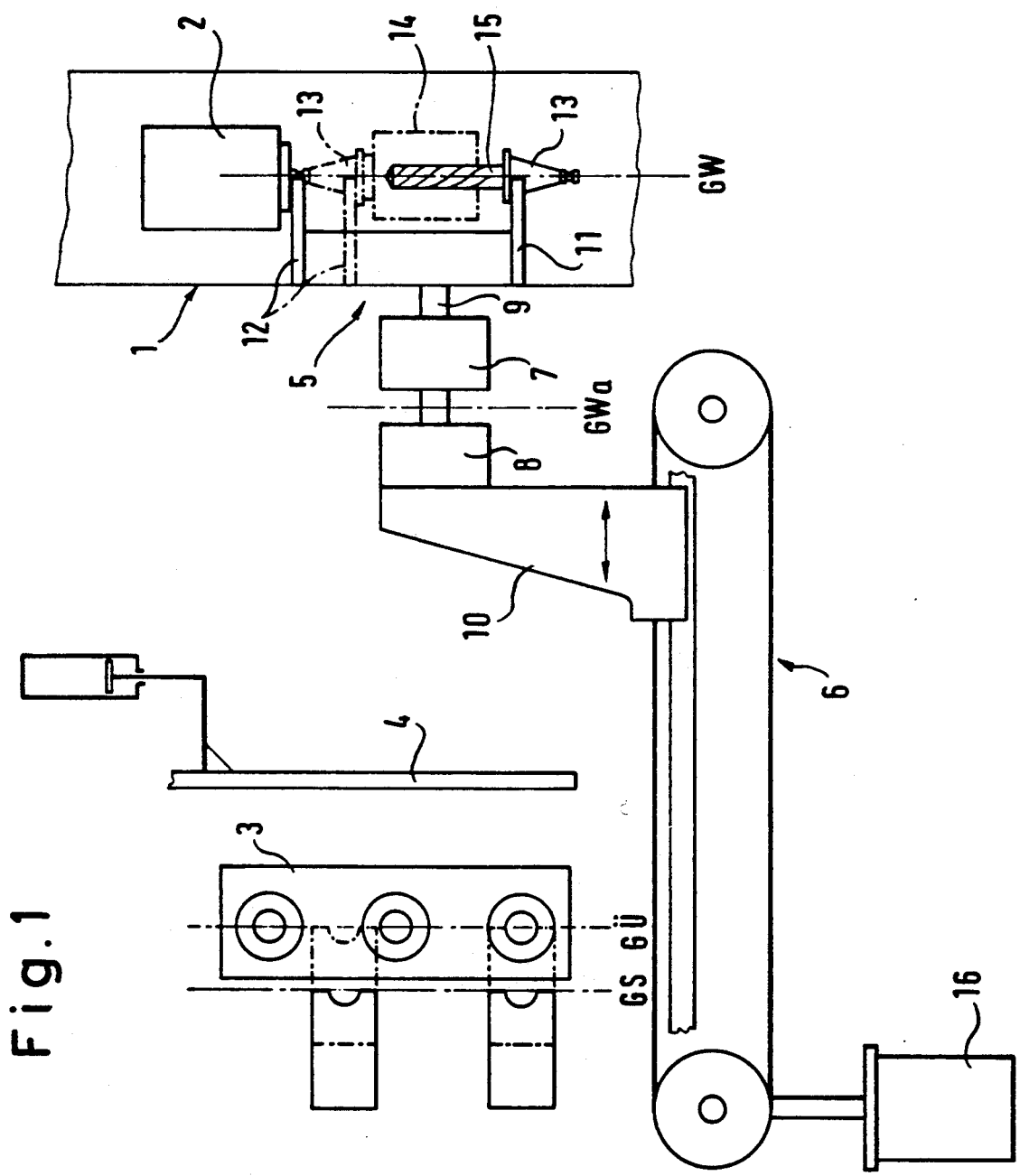

United States Patent [19]

Kessler

[11] Patent Number: 5,107,582
[45] Date of Patent: Apr. 28, 1992

[54] TOOL CHANGING SYSTEM

[75] Inventor: Kurt Kessler, Haar, Fed. Rep. of Germany

[73] Assignee: Wanderer Maschinen GmbH, Haar, Fed. Rep. of Germany

[21] Appl. No.: 248,871

[22] Filed: Sep. 23, 1988

[30] Foreign Application Priority Data

Sep. 30, 1987 [DE] Fed. Rep. of Germany ....... 3733064

[51] Int. Cl.$^5$ ............................................ B23Q 3/157
[52] U.S. Cl. ...................................... 29/568; 414/735; 414/736; 414/738
[58] Field of Search ............... 29/568, 26 A; 414/226, 414/735, 738, 736

[56] References Cited

U.S. PATENT DOCUMENTS

| 4,403,391 | 9/1983 | Peacock ................................ 29/568 |
| 4,742,609 | 5/1988 | Neumann ............................... 29/568 |

FOREIGN PATENT DOCUMENTS

| 2060957 | 5/1972 | Fed. Rep. of Germany . |
| 2629835 | 10/1977 | Fed. Rep. of Germany . |
| 3017613 | 11/1981 | Fed. Rep. of Germany . |
| 3023539 | 1/1982 | Fed. Rep. of Germany . |
| 3344084 | 6/1985 | Fed. Rep. of Germany . |
| 34087349 | 9/1985 | Fed. Rep. of Germany . |
| 237807 | 7/1986 | German Democratic Rep. . |
| 2014882 | 9/1979 | United Kingdom . |

*Primary Examiner*—Z. R. Bilinsky
*Attorney, Agent, or Firm*—Townsend and Townsend

[57] ABSTRACT

A tool changing system for chip forming machine tools is described which with a simple construction ensures a tool change both in conjunction with horizontal spindles and vertical spindles and also spindles which adopt intermediate positions, which minimizes the flight circle or disturbing circle and ensures short change times. This tool changing system includes a double grasper arrangement which is linearly movable by means of a transport device, which can execute pivotal movements over different angular ranges and which has grasper arms which are directed parallel to the pivot axle of the double grasper arrangement and are symmetrically displaced relative to one another in two perpendicular directions relative to the pivot axle, with each grasper arm being adjustable perpendicular to its longitudinal extent over a predeterminable stroke.

24 Claims, 3 Drawing Sheets

TOOL CHANGING SYSTEM

The invention relates to a tool changing system for chip forming machine tools with horizontal and vertical spindles, in particular milling and boring machines, comprising at least one tool magazine and a movable transport device with a grasping unit for the tool transport between the magazine and the preferably horizontally or vertically directed spindle, wherein a pivoting means is associated with the grasper unit which is formed as a double grasper arrangement.

A system of this kind is known from German Offenlegungsschrift 34 08 734. In this known arrangement a changer arm with two arms aligned substantially radially to an axis of rotation is provided, with the axis of rotation being directed at an angle of 45° to the axis of the working spindle. The grasping ends of the arms which are provided with grasping devices are each angled at 45° to the axis of rotation and the changer arm is adjustable relative to the working spindle in the axial direction of the spindle. The grasper ends of the arms are in particular mutually displaced sideways relative to a reference plane extending through the axis of rotation so that the axes of the tools to be used do not cross. The tools are accommodated in the changer arm with an alignment such that their ends which are to be inserted into the working spindle point away from the axis of rotation.

This arrangement indeed attempts to keep the flight circle or disturbing circle during tool changing rotation of the tool arm as small as possible, so that the changer arm does not have to be moved out of the machine range for the tool changing rotation and despite this no collision occurs with a clamped workpiece.

Apart from the fact that this known arrangement is of comparatively complicated construction, and leaves something to be desired with regard to its universal applicability, a relatively large flight circle or disturbing circle is still required, which is the same as saying that disturbing restrictions are present with regard to the size and shape of the clamped workpieces. Furthermore, the disturbing contour is geometrically and mathematically described by obliquely disposed ellipses, i.e. is geometrically complicated to comprehend. The particular programmer of the machine is accordingly not able to take account of the disturbing contour relative to the workpiece using simple means.

It is the object of the invention to construct a tool changing system of the initially named kind in such a way that despite a constructionally simple design one achieves a minimization of the flight circle or disturbing circle, and can ensure short change times and high variability with respect to the size and kind of the tool magazine that is used. Moreover the possibility should exist of effecting a tool change at positions between horizontal and vertical spindles and of simultaneously carrying out tool change procedures at multi-spindle units.

This object is satisfied in accordance with the invention essentially in that the transport device carrying the double grasper arrangement is movable on a guide track which extends parallel to the straight connecting line between the tool changing positions at the magazine and at the spindle and is spaced from the magazine; in that the pivoting means comprises at least one pivotal drive for a first pivotal movement associated with a tool change and for a second pivotal movement associated with the changeover between differently directed tool changes, in particular the changeover between a horizontal and a vertical tool change; in that the grasper arms of the double grasper arrangement are directed parallel to the pivot axle of the double grasper arrangement and are symmetrically displaced relative to one another in two perpendicular directions relative to the pivot axis; and in that each grasper arm is adjustable over a predetermined stroke perpendicular to its longitudinal extent.

Through the special arrangement of the grasper arms relative to the axis of rotation of the double grasper arrangement and through the integration of the actuating devices for carrying out strokes of the grasper arms it is possible to reduce the double grasper arrangement to a compact design for executing pivotal movements, and thus to ensure that the disturbing circle is practically exclusively determined by the outer contour of the most closely packed adjacent tools held in the double grasper arrangement. The resulting largest possible disturbing circle is so small in comparison to customary arrangements that practically any desired layout of workpieces can take place on the associated workpiece clamping pallet.

Furthermore it is of advantage that a substantial reduction of the moment of inertia is obtained through the compact contraction of the double grasper arrangement prior to executing a pivotal movement. This in turn makes it possible to carry out the pivotal movements very rapidly without particular constructional complexity.

The layout of the double grasper arrangement in accordance with the invention makes it possible to provide the change position for the vertical spindle above the change position for the horizontal spindle and on the same side of a vertical plane extending through the pivot axis of the double grasper arrangement and parallel to the same, with the perpendicular distance of the tool changing position for the horizontal spindle from the vertical through the pivot axle of the double grasper arrangement only being approximately three-times as large as the corresponding perpendicular distance of the tool changing position for the vertical spindle.

The transport means preferably consists of a carriage carrying the double grasper arrangement with the carriage being movable on a guide track, in particular a stationary guide track, between a tool changing position, at least one tool transfer or removal position respectively associated with a magazine and at least one searching position.

It is a particular practical advantage with this arrangement that the travelling movements can be executed very rapidly, for example at a speed of 100 m/min and that above all the tool change at the vertical spindle can be carried out just as rapidly as the tool change at the horizontal spindle. The short tool changing times have a correspondingly favourable effect on the economy of the machine tool.

As a result of the rapidity of the tool change at the machine tool adequate time is in each case available for the return transport of the changed tool into a tool magazine and for the pickup of the next required tool. The double grasper arrangement can already be brought into the appropriate waiting position relative to the tool magazine during its circulation, so that the removal of the tool which is sought can take place immediately that tool has entered into the changing position.

The two pivotal drives for the double grasper arrangement are preferably connected in series, with the pivotal drive associated with the tool change being constructed as a rapid pivotal drive while the pivotal drive which carries out the changeover from the horizontal tool change to the vertical tool change can in comparison operate relatively slowly without this having a negative effect on the working steps that are carried out. It is important in all cases that the actual tool change at the machine, both at the horizontal spindle and also at the vertical spindle, takes place extremely rapidly so that adequate time for the subsequent steps is subsequently available. It is of advantage that the double grasper arrangement can already be moved close up to the machine tool, and held in awaiting position prior to carrying out a tool change in the machine tool, so that only a minimal stroke in the direction of the tool changing position is necessary for the actual tool change.

In accordance with a further advantageous layout of the invention several tool magazines which circulate in a vertical plane are arranged adjacent alongside one another, with their tool change positions preferably lying on a straight line and being selectively approachable by means of a carriage carrying the double grasper arrangement. The double grasper arrangement can fundamentally have at least one additional degree of freedom with respect to its path of movement.

Thus a plurality of differently constructed and arranged magazines can be directly approached by means of a single tool changer, which not only results in the possibility of a space saving layout and arrangement of the tool magazines, but above all makes problem-free working with a large number of tools possible without any form of penalty with regard to the actual tool change times. With these variants it is merely necessary to pay attention to the fact that the tool magazines should be so equipped or controlled that unhindered passage of the changer past them is in each case possible.

Further particularly advantageous layouts of the invention are set forth in the subordinate claims.

Figure 2:
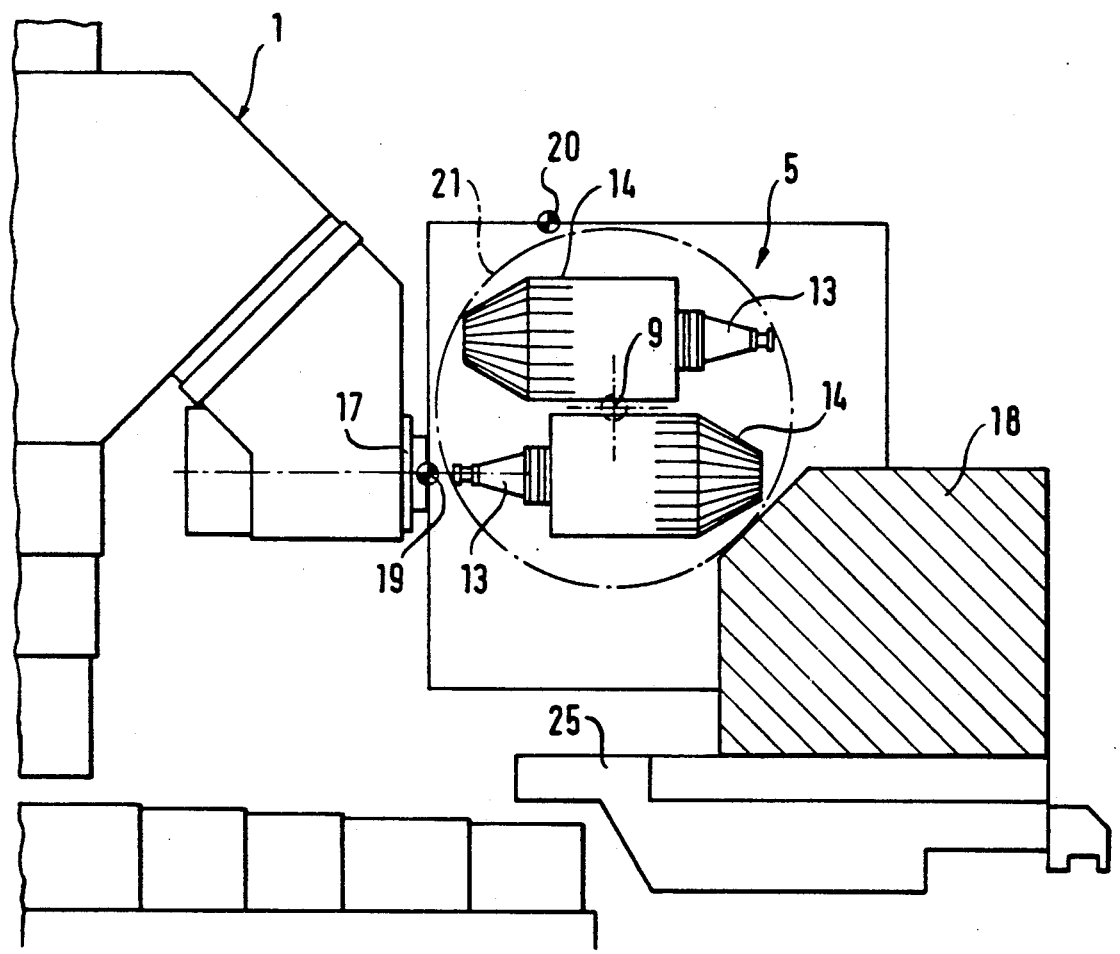
Figure 3:
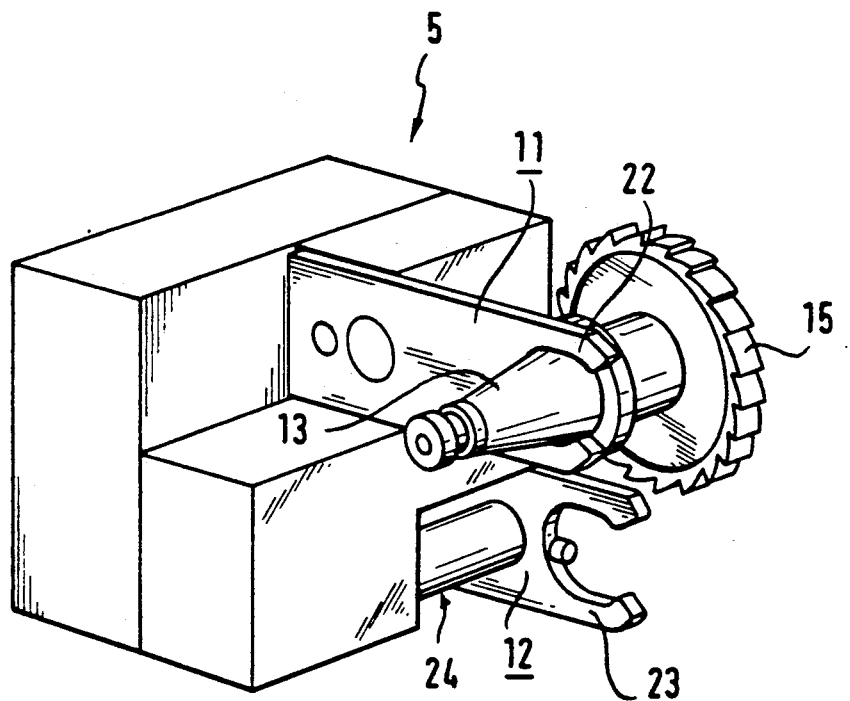

Embodiments of the invention will be explained in more detail in the following with reference to the drawing, which shows:

FIG. 1 a schematic illustration to explain the principle of construction of a tool changing device in accordance with the invention, FIG. 2 is a schematic part illustration of a machine tool with an associated clamping table and a tool changer located in the horizontal change position, and FIG. 3 a perspective illustration of an embodiment of a double grasper arrangement in accordance with the invention.

In FIG. 1 a machine tool 1 equipped with a horizontal spindle and a vertical spindle is indicated in schematic manner, with the use of the vertical spindle being shown in FIG. 1.

One spindle is preferably used which can be changed over between a horizontal position and a vertical position by a pivotal movement in a plane inclined at 45° to the horizontal, i.e. a single spindle can take over the function of both the horizontal spindle and also of the vertical spindle.

At least one tool magazine 3 is associated with the machine tool 1. The tool magazine 3 preferably circulates in a vertical plane and is screened off from the machine tool 1 by a controllable protective door 4.

The transport of the tools between the machine tool 1 and the magazine 3 and also the associated tool change is carried out by, means of a double grasper arrangement 5 which is arranged on a transport device 6 and is movable between the change positions of the machine tool 1 and magazine 3.

A first pivotal drive 7 and a second pivotal drive 8 are located between a carriage 10 belonging to the transport device 6 and the double grasper arrangement 5 and serve to pivot the pivot axle 9 of the double grasper arrangement 5 on the one hand through 180° in connection with a tool change and on the other hand through 90° in connection with the changeover from a horizontal tool changer to a vertical tool changer and vice versa. The pivotal drive 7 which executes the 180° pivotal movement operates during this pivotal movement substantially more rapidly than the pivotal drive 8 which brings about the 90° pivotal movement, so that the tool change can proceed very rapidly. In contrast the changeover from horizontal tool change to vertical tool change can be carried out comparatively slowly outside of the machine tool without this impairing the overall efficiency of the arrangement.

The double grasper arrangement 5 includes two grasper arms 11, 12 which are arranged symmetrical to the pivot axle 9 and displaced relative to the latter. The two grasper arms extend parallel to one another up to the pivot axle. In this way tools 15 can be engaged via corresponding grasping mounts at their respective clamping V-grooves 13 and can be inserted into the respective spindle or magazine or can be taken out of the spindle or magazine. For this purpose each grasper arm 11, 12 is provided with its own drive which makes it possible to move each grasper arm 11, 12 over a predeterminable stroke required for the insertion or extraction of the particular tool.

The grasper arms 11, 12 pick up the tools in oppositely directed manner and the mutual displacement of the grasper arms 11, 12 is so dimensioned that the tightest possible packing is ensured related to the largest possible tool peripheral contour 14 when the grasper arms 11, 12 are retracted.

The transport device 6 can be driven via a drive motor 6, for example with a speed of approximately 100 m/min, can thus be moved between the machine tool 1 and the magazine 3. This makes it possible to approach the grasper waiting position GWa and the grasper change position GW in the machine tool 1 and a grasper search position GS and grasper transfer position GÜ relative to the magazine, in each case in a defined manner.

The procedure for effecting a tool change in the machine tool proceeds in such a way that the double grasper arrangement 5 of which one arm 11 is equipped with a tool which is to be newly inserted is brought into the change position GW. The tool to be removed is then removed from the vertical spindle 2 while executing a corresponding stroke of the grasper arm 12 and the grasper arm 12 is then moved back into its retracted position. A rapid 180° pivotal movement is then executed and the new tool 15 is inserted into the vertical spindle 2 by outward movement of the grasper arm 11. The double grasper arrangement 5 is subsequently moved out of the range of the machine tool 1 and finally the removed tool is deposited in the magazine 3 and the grasper arm 12 is then equipped with the next tool that is required.

If a horizontal spindle is to be equipped in place of the vertical spindle then the individual processes take place in the same manner however in this case the double grasper arrangement 5 is rotated while still in the magazine region through 90° by means of the pivotal drive 8. Of significance is the fact that the change procedures at the horizontal spindle and at the vertical spindle can always take place at practically the same speed.

FIG. 2 shows a machine tool 1 equipped with a spindle head pivotable between a horizontal position and a vertical position, with the spindle head adopting the position of a horizontal spindle 17 in the illustrated position. The spindle head is movable via the machine tool 1 in the x, y and z directions in the customary manner.

A clamping table 25 is associated with the machine tool 1 for the fixation of the respective workpiece to be machined. It is basically also possible to use a rotary table as the clamping table and in this case a fixed tool can be inserted or changed into the respective spindle and the spindle drive is blocked.

The double grasper arrangement 5 is illustrated in schematic manner between the horizontal spindle 17 and the workpiece 18 and indeed with the grasper arms located in the retracted position which results in the tightest packing of the tools which are to be picked up by the grasper arms and held via the clamping V grooves 13. It can be seen here that the mutual spacing of the tool mounts are so selected that the tools with the greatest circumferential contour 14 lie closely alongside one another so that a disturbing circle or flight circle 21 of minimum size results relative to the axle of rotation 9. This in turn has the result that the clamping table 25 can be equipped practically as desired since only an almost negligible small dead region results due to the small disturbing circle, i.e. the disturbing circle 21 and the clamping range only overlap to a minor degree.

This small disturbing circle also has the result that the moment of inertia which occurs during the pivotal movement of the double grasper is small and thus very rapid movements can be carried out.

The horizontal tool change position 19 and the vertical tool change position 20 is also set forth in FIG. 2 and it can be seen that these change positions advantageously lie closely alongside one another and can accordingly also be rapidly approached. The reduction of the machine movement achieved through the self-movement of the tool changer favours in advantageous manner short clamping to clamping times of the tool changer.

FIG. 3 shows in perspective illustration an embodiment of the double grasper arrangement 5 of the invention with the grasper 11 being equipped with a tool 15, that is to say the tool 15 is fixed in a grasper mount 22 provided at one end of the arm 11. The grasper mount 23 of the other grasper arm 12 is free and thus ready for the removal or receipt of a tool. The grasper mounts 22, 23 are preferably formed by pivotally journalled grasping levers which operate in pincer-like manner and which are biased by spring force into the holding position and thus ensure an initial loose holding of the respective tool via a snap in process. Final fixing of the respective tool is achieved in a particularly advantageous and simple manner by the stroke movement of the grasper arms and indeed so that the grasper levers can be clamped in the fixing position during this stroke movement by fixed cams or abutments. Whereas this clamping is thus compulsorily and automatically effected with the appropriate reliability during the draw-in movement a corresponding release procedure necessarily results during the extension movement. This double function realized during the particular stroke movement not only makes the use of additional actuating devices such as hydraulic control members superfluous but also brings about an acceleration of the working processes which take place one after the another, and thus an advantageous time saving.

While the grasper arm 11 equipped with the tool 15 is located in its retracted position the grasper arm 12 is shown in its extended position via its associated piston-in-cylinder arrangement 24.

This extremely simple and compactly constructed double grasper arrangement not only makes a problem-free and rapid tool change possible in the particular machine tool, and indeed in connection with both a vertical spindle and a horizontal spindle, and also spindles which adopt intermediate positions, but also makes it possible to operate with several tool magazines arranged alongside one another which can be approached as required. Thus one can operate with compact tool magazines and the plant can be enlarged or developed in accordance with the particular requirements without difficulties.

I claim:

1. (Twice Amended) A machine tool [in accordance with claim 19] comprising:

a machine head having a tool receiving spindle;

a tool storage magazine spaced from said machining head;

a transport carriage movable from said tool storage magazine to a position adjacent said machining head;

a tool changing head;

means for pivotally mounting said tool changing head on said carriage for rotation about a pivot axis;

first and second tool grasping arms provided on said tool changing head and each having a respective tool grasping device, said first and second tool grasping arms extending parallel to said pivot axis and being disposed on opposite sides thereof and symmetrically displaced in two opposite directions perpendicular to said pivot axis;

respective means mounted on said tool changing head for translating each said grasping arm in a direction perpendicular to said arm over a predetermined stroke to effect tool changes into and out of a spindle of the associated machining tool;

means for pivoting said tool changing head about said pivot axis; and a first pivotal drive for executing a 180° pivotal movement associated with a tool change and a second pivotal drive for executing a pivotal movement through 90° for the changeover between a horizontal tool change and a vertical tool change.

2. A machine tool in accordance with claim 1 wherein the spindle comprises a horizontal spindle and wherein the transport carriage is movable on a guide track which extends parallel to the straight connecting line between the tool changing positions at the magazine and at the horizontal spindle.

3. A machine tool in accordance with claim 1 wherein the tool grasper arms extend parallel to and displaced from one another are formed to pick-up oppositely directed tools held with their axes parallel in the tool grasping device.

4. A machine tool in accordance with claim 1 wherein the perpendicular distance between the pivot axis of the tool changing head and the respective center of the means mounted on the tool changing head is substantially the same as or fractionally larger than the radius of the maximum tool contour.

5. A machine tool in accordance with claim 1 wherein each grasper arm is adjustable by means of an individually controllable piston-in-cylinder arrangement directed perpendicular to the pivot axis of the tool changing head over a stroke which ensures the removal or insertion of a tool at the machine tool and/or at the magazine.

6. A machine tool in accordance with claim 1, wherein said tool grasping devices are disposed on said tool changing head such that when a respective tool is received in each tool grasping device said tools are disposed opposite and substantially parallel to one another on opposite sides of said pivot axis.

7. A machine tool in accordance with claim 6, wherein said means for pivoting said tool changing head about said pivot axis comprises means for pivoting said tool changing head through an angle of 180°.

8. A machine tool in accordance with claim 7, wherein said spindle is a horizontal spindle.

9. A machine tool in accordance with claim 1, wherein said respective tool grasping devices are pivotable by said pivoting means in a plane of rotation, and wherein said respective means for translating each said grasping arm are disposed behind said plane of rotation.

10. A machine tool in accordance with claim 1 wherein each tool grasping device grasps the associated machine tool perpendicular to a longitudinal axis of the associated machine tool.

11. (Amended) A machine tool comprising:
a machining head having a tool receiving spindle;
a tool storage magazine spaced from said machining head;
a transport carriage movable from said tool storage magazine to a position adjacent said machining head;
a tool changing head;
means for pivotally mounting said tool changing head on said carriage for rotation about a pivot axis;
first and second tool grasping arms provided on said tool changing head and each having a respective tool grasping device, said first and second tool grasping arms extending parallel to said pivot axis and being disposed on opposite sides thereof and symmetrically displaced in two opposite directions perpendicular to said pivot axis;
[respective means] first and second piston in cylinder arrangements mounted on said tool changing head and respectively associated with said first and second tool grasping arm for translating each said grasping arm in a direction perpendicular to said arm over a predetermined stroke to effect tool changes into and out of a spindle of the associated machining tool; the tool grasping device associated with each said grasping arm being positioned axially spaced from the associated piston in cylinder arrangement relative to said pivot axis whereby a tool received in said tool grasping device lies axially spaced from and radially overlapping said first and second piston in cylinder arrangements.

12. A machine tool according to claim 1 wherein the means for translating comprises first and second piston in cylinder arrangements respectively associated with the first and second tool grasping arms, the tool grasping device associated with each said grasping arm being positioned axially spaced from the associated piston in cylinder arrangement relative to said first axis whereby a tool received in said tool grasping device lies axially spaced from and radially overlapping said first and second piston in cylinder arrangements.

13. A machine tool comprising:
a machine head having a tool receiving spindle;
a tool storage magazine spaced from said machining head;
a transport carriage movable from said storage magazine to a position adjacent said machining head;
a tool changing head;
means for pivotally mounting said tool changing head on said carriage for rotation about a pivot axis;
first and second tool grasping arms provided on said tool changing head and each having a respective tool grasping device, said first and second tool grasping arms extending parallel to said pivot axis and being disposed on opposite sides thereof and symmetrically displaced in two opposite directions perpendicular to said pivot axis;
respective means mounted on said tool changing head for translating each said grasping arm in a direction perpendicular to said arm over a predetermined stroke to effect tool changes into and out of a spindle of the associated machining tool;
means for pivoting said tool changing head about said pivot axis; and
wherein the spindle includes a horizontal spindle position and a vertical spindle position and wherein the tool changing position for the vertical spindle is disposed above the tool changing position for the horizontal spindle and on the same side of a vertical plane extending through the pivot axis of the tool changing head and parallel to the same.

14. A machine tool in accordance with claim 13, wherein the spindle is movable between the horizontal and vertical positions and further comprises tool changing positions between the tool changing position for the vertical spindle and the tool changing position for the horizontal spindle and are disposed on a circular arc connecting the two changing positions.

15. A machine tool comprising:
a machining head having a tool receiving spindle movable between a horizontal position and a vertical position;
a tool storage magazine spaced from said machining head;
a transport carriage movable from said tool storage magazine to a position adjacent said machining head;
a tool changing head;
means for pivotally mounting said tool changing head on said carriage for rotation about a pivot axis;
first and second tool grasping arms provided on said tool changing head and each having a respective tool grasping device, said first and second tool grasping arms extending parallel to said pivot axis and being disposed on opposite sides thereof and symmetrically displaced in two opposite directions perpendicular to said pivot axis; respective means mounted on said tool changing head for translating each said grasping arm in a direction perpendicular to said arm over a predetermined stroke to effect tool changes into and out of a spindle of the associated machine tool; and
means for pivoting said tool changing head about said pivot axis;

wherein the perpendicular distance of the tool changing position for the horizontal spindle from the vertical through the pivot axis of the tool changing head is approximately three times as large as the corresponding perpendicular distance of the changing position for the vertical spindle.

16. A machine tool comprising:
a machine head having a tool receiving spindle;
a tool storage magazine spaced from said machining head;
a transport carriage movable from said tool storage magazine to a position adjacent said machining head;
a tool changing head;
first and second drive means for pivotally mounting said tool changing head on said carriage for rotation about a pivot axis, said first and second pivotal drives provided between the carriage and the tool changing head connected in series;
first and second tool grasping arms provided on said tool changing head, each having a respective tool grasping device, said first and second tool grasping arms extending parallel to said pivot axis and being disposed on opposite sides thereof and symmetrically displaced in two opposite directions perpendicular to said pivot axis; and
respective means mounted on said tool changing head for translating each said grasping arm in a direction perpendicular to said arm over a predetermined stroke to effect tool changes into and out of a spindle of the associated machine tool.

17. A machine tool in accordance with claim 16, wherein said first pivotal drive means for pivotal movement is constructed as a rapid pivotal drive for up to and including 180° movement in comparison to the second pivotal drive means for pivotal movement, said second pivotal means constructed for up to and including 90° movement.

18. A machine tool comprising:
a machining head having a vertical tool receiving spindle;
a tool storage magazine spaced from said machining head;
a transport carriage movable from said tool storage magazine to a position adjacent said machining head;
a tool changing head;
means for pivotally mounting said tool changing head on said carriage for rotation about a pivot axis;
first and second tool grasping arms provided on said tool changing head and each having a respective tool grasping device, said first and second tool grasping ends extending parallel to said pivot axis and being disposed on opposite sides thereof and symmetrically displaced in said two opposite directions perpendicular to said pivot axis, said tool grasping devices are disposed on said tool changing head such that when a respective tool is received in each tool grasping device said tools are disposed opposite and substantially parallel to one another on opposite sides of said pivot axis;
first and second piston in cylinder arrangements mounted on said tool changing head and respectively associated with said first and second tool grasping arms for translating each said grasping arm in a direction perpendicular to said arm over a predetermined stroke to effect tool changes into and out of a spindle of the associated machine tool;
the tool grasping devices associated with each said grasping arm being positioned axially spaced from the associated piston in cylinder arrangement relative to said pivot axis whereby a tool received in said tool grasping device lies axially spaced from and radially overlapping said first and second piston in cylinder arrangements, and
means for pivoting said tool changing head about said pivot axis through an angle of 180°.

19. A machine tool comprising:
a machining head having a tool receiving spindle;
a tool storage magazine spaced from said machining head;
a transport carriage movable from said tool storage magazine to a position adjacent said machining head;
a tool changing head;
means for pivotally mounting said tool changing head on said carriage for rotation about a pivot axis;
first and second tool grasping arms provided on said tool changing head and each having a respective tool grasping device, said first and second tool grasping arms extending parallel to said pivot axis and being disposed on opposite sides thereof and symmetrically displaced in said two opposite directions perpendicular to said pivot axis, said tool grasping devices are disposed on said tool changing head such that when a respective tool is received in each tool grasping device said tools are disposed opposite and substantially parallel to one another on opposite sides of said pivot axis;
respective means mounted on said tool changing head for translating each said grasping arm in a direction perpendicular to said arm over a predetermined stroke to effect tool changes into and out of a spindle of the associated machine tool; and
means for pivoting said tool changing head about said pivot axis through an angle of 180°; and
means for changing said spindle from a first position to a second position at 90° to said first position and wherein a second means is provided for pivoting said tool changing head through 90° to correspond with a change of said spindle from said first position to said second position.

20. A machine tool in accordance with claim 19, wherein said first position, said spindle is horizontally directed and wherein in said second position, said spindle is vertically directed.

21. A tool changer comprising:
a base means movable towards and away from an associated machine tool;
a tool changing head;
means for pivotally mounting said tool changing head on said base means for rotation about a pivot axis;
first and second tool grasping arms provided on said tool changing and each having a respective tool grasping device, wherein said tool grasping devices are disposed on said tool changing head such that when a respective tool is received in each tool grasping device said tools are disposed opposite and substantially parallel to one another on opposite sides of said pivot axis, said first and second tool grasping arms extending parallel to said pivot axis and being disposed on opposite sides thereof and symmetrically displaced in two opposite directions perpendicular to said pivot axis;
first and second piston in cylinder arrangements mounted on said tool changing head and respectively associated with said first and second tool grasping arms for transplanting each said grasping arm in a direction perpendicular to said arm over a predetermined stroke to effect tool changes into and out of a spindle of the associated machine tool; the tool grasping devices associated with each said grasping arm being positioned axially spaced from the associated piston in cylinder arrangement relative to said pivot axis whereby a tool received in said tool grasping device lies axially spaced from and radially overlapping said first and second piston in cylinder arrangements, and means for pivoting said tool changing head about said pivot axis, said means comprising pivoting said tool changing head through an angle of up to 180° and further means for pivoting said tool changing head through an angle of up to 90° about said pivot axis.

22. A tool changer in accordance with claim 21, wherein said respective tool grasping devices are pivotable by said pivoting means in a plane of rotation, and wherein said respective means for translating each said grasping arm are disposed behind said plane of rotation.

23. A tool changer in accordance with claim 21 wherein each tool grasping device grasps the associated machine tool perpendicular to a longitudinal axis of the associated machine tool.

24. A tool changing head comprising:
means for pivotally mounting said tool changing head for rotation about a pivot axis;
first and second tool grasping arms provided on said tool changing head and each having a respective tool grasping device, said first and second tool grasping arms extending parallel to said pivot axis and being disposed on opposite sides thereof and symmetrically displaced in two opposite directions perpendicular to said pivot axis;
first and second piston in cylinder arrangements mounted on said tool changing head and respectively associated with said first and second tool grasping arms for translating each said grasping arm in a direction perpendicular to said arm over a predetermined stroke to effect tool changes; the tool grasping device associated with each said grasping arm being positioned axially spaced from the associated piston in cylinder arrangement relative to said pivot axis, whereby a tool received in said tool grasping device lies axially spaced from and radially overlapping said first and second piston in cylinder arrangements.

* * * * *